(12) United States Patent
Xu

(10) Patent No.: US 12,199,774 B2
(45) Date of Patent: Jan. 14, 2025

(54) METHOD FOR FEEDBACK INFORMATION TRANSMISSION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 338 days.

(21) Appl. No.: 17/702,450

(22) Filed: Mar. 23, 2022

(65) Prior Publication Data

US 2022/0231796 A1    Jul. 21, 2022

Related U.S. Application Data

(63) Continuation of application No. PCT/CN2020/074298, filed on Feb. 4, 2020.

(30) Foreign Application Priority Data

Nov. 6, 2019    (CN) .......................... 201911079098.3
Nov. 8, 2019    (CN) .......................... 201911093151.5

(51) Int. Cl.
*H04L 1/1812*   (2023.01)
*H04L 5/00*   (2006.01)

(52) U.S. Cl.
CPC .......... *H04L 1/1812* (2013.01); *H04L 5/0055* (2013.01)

(58) Field of Classification Search
CPC ... H04L 1/1812; H04L 5/0055; H04L 1/1861; H04L 1/1864

(Continued)

(56) References Cited

U.S. PATENT DOCUMENTS

2019/0089494 A1\*   3/2019   Park ...................... H04L 1/1812
2019/0327755 A1     10/2019  Xiong et al.
(Continued)

FOREIGN PATENT DOCUMENTS

CN       106549734 A    3/2017
CN       109478978 A    3/2019
(Continued)

OTHER PUBLICATIONS

MCC Support, Final Report of 3GPP TSG RAN WG1 #99 v1.0.0, 3GPP TSG RAN WG1 Meeting #100-e e-Meeting, R1-2000151, Feb. 24-Mar. 6, 2020. (163 pages).
(Continued)

*Primary Examiner* — Michael Y Mapa
(74) *Attorney, Agent, or Firm* — Young Basile Hanlon & MacFarlane, P.C.

(57) ABSTRACT

A method for feedback information transmission, a terminal device, and network device are provided. The method includes the following. A terminal device receives downlink control information (DCI) transmitted by a network device for scheduling target data. The terminal device receives the target data transmitted by the network device. The terminal device determines a feedback parameter of a hybrid automatic repeat request-acknowledgement (HARQ-ACK) codebook according to the DCI. The HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode. The terminal device transmits the HARQ-ACK codebook to the network device according to the feedback parameter.

19 Claims, 5 Drawing Sheets

(58) Field of Classification Search
USPC ........ 370/329; 455/13.4, 24, 69, 126, 127.5, 455/426.1, 450–452.2, 458, 522, 515, 574
See application file for complete search history.

(56) References Cited

U.S. PATENT DOCUMENTS

2020/0036480 A1* 1/2020 Yang ..................... H04B 7/024
2020/0374089 A1* 11/2020 Yang ..................... H04L 1/1896

FOREIGN PATENT DOCUMENTS

| CN | 110034868 A | 7/2019 |
| CN | 110086583 A | 8/2019 |
| CN | 110149172 A | 8/2019 |
| CN | 110166181 A | 8/2019 |

OTHER PUBLICATIONS

3GPP TSG RAN WG1 #98b; R1-1911295; Chongqing, China, Oct. 14-20, 2019.
International search report with English Translation issued in corresponding international application No. PCT/CN2020/074298 dated Jul. 29, 2020.
LG Electronics, HARQ procedure for NR-U, 3GPP TSG RAN WG1 #98bis, R1-1910821, Nov. 14-20, 2019. (22 pages).
OPPO, Summary#2 on UCI enhancements for URLLC, 3GPP TSG RAN WG1 #97, R1-1907777, May 13-17, 2019. (20 pages).
Extended European Search Report for EP Application 20885732.6 mailed Aug. 30, 2022. (8 pages).
China First Office Action with English Translation issued in corresponding CN Application No. 202210501708X dated Jun. 2, 2023.

* cited by examiner

METHOD FOR FEEDBACK INFORMATION TRANSMISSION, TERMINAL DEVICE, AND NETWORK DEVICE

CROSS-REFERENCE TO RELATED APPLICATION(S)

This application is a continuation of International Application No. PCT/CN2020/074298, filed on Feb. 4, 2020, which claims priority to Chinese Patent Application No. 201911093151.5, filed on Nov. 8, 2019 and Chinese Patent Application No. 201911079098.3, filed on Nov. 6, 2019, the disclosures of all of which are hereby incorporated by reference in their entireties.

TECHNICAL FIELD

Implementations of the present disclosure relate to the field of communication, and more particularly, to a method for feedback information transmission, a terminal device, and a network device.

BACKGROUND

A concept of hybrid automatic repeat request-acknowledgement (HARQ-ACK) codebook is introduced in a new radio (NR) system, the NR system is also referred to as a fifth generation (5G) system or a 5G network. The HARQ-ACK codebook is used to feed back HARQ-ACK information of multiple pieces of downlink (DL) data together. At present, the HARQ-ACK codebook may be determined in two modes: a semi-static feedback mode (i.e., type 1) and a dynamic feedback mode (i.e., type 2). For the semi-static feedback mode, the size of the HARQ-ACK codebook and a correspondence between each indicator field in the HARQ-ACK codebook and a DL physical downlink shared channel (PDSCH) are determined semi-statically. For the dynamic feedback mode, the size of the HARQ-ACK codebook and the correspondence between each indicator field in the HARQ-ACK codebook and the PDSCH are determined dynamically, which specifically depends on a downlink assignment index (DAI) indication.

Reliability requirements and delay requirements of DL data of different traffic types are different, and a traffic volume of DL data to be fed back is also changing. Therefore, how to meet feedback requirements of different DL data without resource waste is an open problem.

SUMMARY

In a first aspect, a method for feedback information transmission is provided. The method includes the following. A terminal device receives downlink control information (DCI) transmitted by a network device for scheduling target data. The terminal device receives the target data transmitted by the network device. The terminal device determines a feedback parameter of a hybrid automatic repeat request-acknowledgement (HARQ-ACK) codebook according to the DCI, where the HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode. The terminal device transmits the HARQ-ACK codebook to the network device according to the feedback parameter.

In a second aspect, a terminal device is provided. The terminal device includes a transceiver, a processor, and a memory. The memory is configured to store computer programs. The processor is configured to invoke and execute the computer programs stored in the memory to: cause the transceiver to: receive DCI transmitted by a network device for scheduling target data and receive the target data transmitted by the network device, determine a feedback parameter of a HARQ-ACK codebook according to the DCI received by the receiving unit, where the HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode, and cause the transceiver to transmit the HARQ-ACK codebook to the network device according to the feedback parameter determined by the determining unit.

In a third aspect, a network device is provided. The network device includes a transceiver, a processor, and a memory. The memory is configured to store computer programs. The processor is configured to invoke and execute the computer programs stored in the memory to cause the transceiver to: transmit DCI to a terminal device for scheduling target data, where the DCI is used for the terminal device to determine a feedback parameter of a HARQ-ACK codebook, the HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode, transmit the target data to the terminal device, and receive the HARQ-ACK codebook transmitted by the terminal device according to the feedback parameter.

DETAILED DESCRIPTION

The following will describe technical solutions of implementations of the present disclosure with reference to the accompanying drawings. Apparently, implementations described herein are merely some implementations, rather than all implementations, of the disclosure. Based on the implementations of the present disclosure, all other implementations obtained by those of ordinary skill in the art without creative effort shall fall within the protection scope of the disclosure.

The technical solutions of implementations of the present disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations of the present disclosure are also applicable to these communication systems.

Optionally, a communication system of implementations of the present disclosure may be applied to a carrier aggregation (CA) scenario, a dual connectivity (DC) scenario, or a standalone (SA) network deployment scenario.

Figure 1:
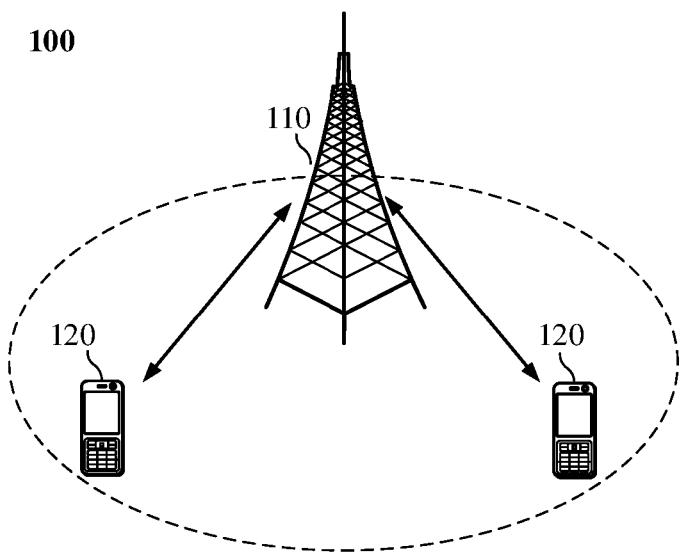
FIG. 1 is a schematic diagram of a possible wireless communication system applied in implementations of the present disclosure.

Exemplarily, as illustrated in FIG. 1, a wireless communication system 100 may include a network device 110. The network device 110 may be a device that can communicate with a terminal device. The network device 110 can provide a communication coverage for a specific geographical area and communicate with terminal devices in the coverage area. Optionally, the network device 110 may be a base transceiver station (BTS) in the GSM or in the CDMA system, or may be a NodeB (NB) in the WCDMA system, or may be an evolutional Node B (eNB or eNodeB) in the LTE system, a network-side device in an NR system, or a radio controller in a cloud radio access network (CRAN). Alternatively, the network device may be a relay station, an access point, an in-vehicle device, a wearable device, a hub, a switch, a bridge, a router, a network-side device in a next generation network, or a network device in a future evolved public land mobile network (PLMN).

The wireless communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal".

The terminal device 120 may be mobile or fixed. Optionally, the terminal device 120 may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the future 5G network, a terminal device in the future evolved PLMN, etc. Optionally, the terminal devices 120 may communicate with each other through device to device (D2D) communication.

Specifically, the network device 110 may provide services for a cell, and the terminal device 120 may communicate with the network device 110 through a transmission resource (for example, a frequency domain resource or a spectrum resource) for the cell. The cell may be a cell corresponding to the network device 110 (for example, a base station). The cell may correspond to a macro base station, and may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

FIG. 1 exemplarily illustrates one network device and two terminal devices. Optionally, the wireless communication system 100 may include multiple network devices, and there may be other numbers of terminal devices in a coverage area of each of the network devices, which is not limited herein.

Optionally, the wireless communication system 100 may further include other network entities such as a network controller, a mobility management entity, or the like, which is not limited herein.

A terminal device can feed back hybrid automatic repeat request-acknowledgement (HARQ-ACK) information of multiple pieces of downlink (DL) data to a network device simultaneously through a HARQ-ACK codebook. For a semi-static feedback mode, the size of the HARQ-ACK codebook and a correspondence between each indicator field in the HARQ-ACK codebook and DL data, DL transmission, or a PDSCH are determined semi-statically. For a dynamic feedback mode, the size of the HARQ-ACK codebook and the correspondence between each indicator field in the HARQ-ACK codebook and the DL data, DL transmission, or PDSCH are determined dynamically, which specifically depends on a DAI instruction. When the semistatic feedback mode is adopted, because it does not depend on the DAI instruction, there is no inconsistent understanding between the network device and the terminal device. However, because the size of the HARQ-ACK codebook is fixed, when the amount of DL data transmission is small, there is a waste of feedback resources. For the dynamic feedback mode, the size of the HARQ-ACK codebook changes with a data transmission situation. However, if the terminal device fails to detect a DL control channel successfully, there may be an inconsistent understanding between the network device and the terminal device.

In addition, if the terminal device feeds back HARQ-ACK information of multiple pieces of DL data simultaneously through the HARQ-ACK codebook, and these pieces of DL data have different requirements for reliability and delay of the HARQ-ACK information, then the HARQ-ACK codebook is unable to meet feedback requirements of all pieces of DL data at the same time.

Figure 2:
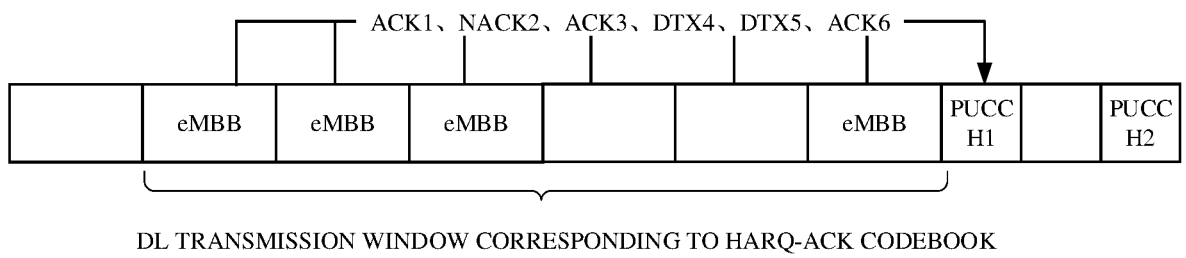
FIG. 2 is a schematic diagram of a dynamic feedback mode of a hybrid automatic repeat request-acknowledgement (HARQ-ACK) codebook.

For example, FIG. 2 is a schematic diagram of HARQ-ACK codebook transmission in a semi-static feedback mode. A DL transmission window corresponding to the HARQ-ACK codebook includes six DL transmission resources, and there is DL data on the first transmission resource, the second transmission resource, the third transmission resource, and the sixth transmission resource among the six DL transmission resources. The HARQ-ACK information of the DL data on the four transmission resources is acknowledgement (ACK) 1, negative acknowledgement (NACK) 1, NACK 2, ACK 3, and ACK 6 in sequence. There is no DL data on the fourth transmission resource and the fifth transmission resource in the DL transmission window, which are denoted as discontinuous transmission (DTX) 4 and DTX 5 respectively. The terminal device may transmit the HARQ-ACK codebook on physical uplink control channel (PUCCH) 1, and the HARQ-ACK codebook includes six indicator fields corresponding to the HARQ-ACK information of the DL data on the six transmission resources in sequence. Assuming that 1 represents ACK and 0 represents NACK, then the HARQ-ACK codebook is 101xx1, where "x" represents a placeholder, which indicates that there is no HARQ-ACK information on the fourth and fifth transmission resources.

It can be seen that, the size of the HARQ-ACK codebook in the semi-static feedback mode is fixed. If the current amount of data is small, for example, there is DL data only on the third transmission resource in the DL transmission window corresponding to the HARQ-ACK codebook and no DL data on other transmission resources, a 6-bit HARQ-ACK codebook may still be fed back, thereby increasing unnecessary bit overhead.

Figure 3:
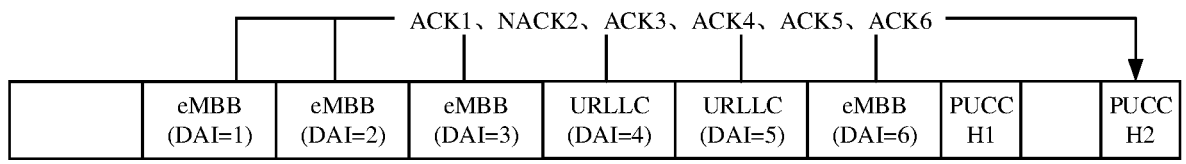
FIG. 3 is a schematic diagram of a semi-static feedback mode of a HARQ-ACK codebook.

For another example, FIG. 3 is a schematic diagram of HARQ-ACK codebook transmission in a dynamic feedback mode. The HARQ-ACK codebook includes HARQ-ACK information of DL data of two traffic types. Data of enhance mobile broadband (eMBB) type has a low latency requirement, while data of ultra-reliable and low-latency communication (URLLC) type has a high latency and reliability requirement. For each piece of DL data, downlink control information (DCI) may carry a DAI corresponding to the DL data, and the DAI may indicate a sequence of the HARQ-ACK information of six pieces of DL data in the HARQ-ACK codebook. For example, DAI=1 indicates that the HARQ-ACK information of the data is the first HARQ-ACK information among the HARQ-ACK information fed back on the same PUCCH, and DAI=2 indicates that the HARQ-ACK information of the data is the second HARQ-ACK information among the HARQ-ACK information fed back on the same PUCCH. HARQ-ACK information of DL data with DAI=1 is represented by the first indicator field in the HARQ-ACK codebook transmitted on the PUCCH, and HARQ-ACK information of DL data with DAI=2 is represented by the second indicator field in the HARQ-ACK codebook transmitted on the PUCCH, and the like. If the HARQ-ACK codebook is transmitted on PUCCH 2, a delay requirement of URLLC type data may not be met. In addition, since feedback of HARQ-ACK information of URLLC type data requires high reliability, when transmitting the HARQ-ACK codebook on PUCCH 2, the code rate needs to be set low. However, this is wasteful for eMBB type data. If the code rate needs to be set high on PUCCH 2, a reliability requirement of URLLC type data may not be met.

Therefore, implementations of the present disclosure propose that, the network device may flexibly indicate to the terminal device via a DCI a feedback parameter to be used to feed back the HARQ-ACK codebook. After receiving the DCI, the terminal device may obtain the feedback parameter used to transmit the HARQ-ACK codebook according to the DCI, thereby meeting feedback requirements of different DL data without resource waste.

Figure 4:
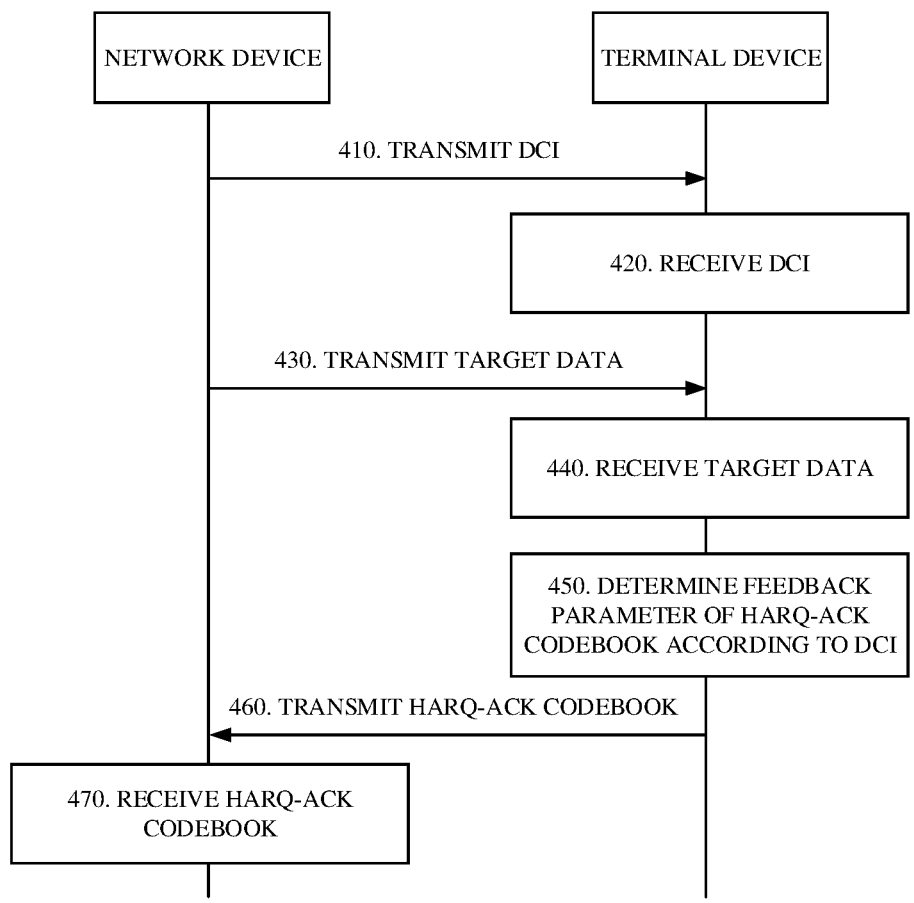
FIG. 4 is an interaction flowchart of a method for feedback information transmission according to implementations of the present disclosure.

FIG. 4 is a schematic flowchart of a method for feedback information transmission according to implementations of the present disclosure. The method illustrated in FIG. 4 may be performed by a terminal device and a network device. The terminal device may be, for example, the terminal device 120 illustrated in FIG. 1, and the network device may be, for example, the network device 110 illustrated in FIG. 1. As illustrated in FIG. 4, the method for feedback information transmission 400 may include some or all of the following operations.

In 410, the network device transmits a DCI to the terminal device for scheduling target data.

The DCI is used for the terminal device to determine a feedback parameter of a HARQ-ACK codebook.

The HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode.

In 420, the terminal device receives the DCI transmitted by the network device.

In 430, the network device transmits the target data to the terminal device.

In 440, the terminal device receives the target data transmitted by the network device.

In 450, the terminal device determines the feedback parameter of the HARQ-ACK codebook according to the DCI.

In 460, the terminal device transmits the HARQ-ACK codebook to the network device according to the feedback parameter.

In 470, the network device receives the HARQ-ACK codebook transmitted by the terminal device according to the feedback parameter.

Specifically, after the network device transmits the target data to the terminal device, the terminal device needs to feed back the HARQ-ACK information of the target data to the network device. The terminal device may feed back the HARQ-ACK information of the target data to the network device through the HARQ-ACK codebook on a feedback resource in a certain feedback mode. The HARQ-ACK codebook may include at least one indicator field, and the at least one indicator field respectively indicates HARQ-ACK information of at least one piece of DL data including the target data, thereby feeding back the HARQ-ACK information of the at least one piece of DL data simultaneously. The terminal device may determine the feedback parameter for transmitting the HARQ-ACK codebook according to the DCI for scheduling the target data, and the feedback parameter may include the feedback mode and/or the feedback resource of the HARQ-ACK codebook. After configuring the feedback mode and/or the feedback resource of the HARQ-ACK codebook for the terminal device, the network device may indicate the feedback mode and/or the feedback resource to the terminal device via the DCI, so that the terminal device may know which feedback mode to use and/or on which feedback resource to transmit the HARQ-ACK codebook to the network device according to the detected DCI.

Optionally, the method further includes the following. The terminal device determines a position of the HARQ-ACK information of the target data in the HARQ-ACK codebook according to a position of the target data in a transmission window corresponding to the HARQ-ACK codebook, if the terminal device determines that the feedback mode of the HARQ-ACK codebook is the semi-static feedback mode.

Optionally, the method further includes the following. The terminal device determines a position of the HARQ-ACK information of the target data in the HARQ-ACK codebook according to a DAI of the target data carried in the DCI, if the terminal device determines that the feedback mode of the HARQ-ACK codebook is the dynamic feedback mode.

Specifically, for the semi-static feedback mode, the HARQ-ACK codebook may correspond to a DL transmission window, the HARQ-ACK codebook includes at least one indicator field, and the DL transmission window includes at least one transmission resource in one-to-one correspondence with the at least one indicator field. Each indicator field in the HARQ-ACK codebook indicates HARQ-ACK information of DL data transmitted on a corresponding transmission resource. For the dynamic feedback mode, the at least one indicator field in the HARQ-ACK codebook indicates feedback information of at least one piece of DL data respectively. For each piece of DL data, a DCI corresponding to the DL data carries a DAI of the DL data. The DAI indicates a position of the HARQ-ACK information of the DL data in the HARQ-ACK codebook. For example, DAI=1 indicates that the HARQ-ACK information of the data is indicated on the first indicator field in the HARQ-ACK codebook, and DAI=2 indicates that the HARQ-ACK information of the data is indicated on the second indicator field in the HARQ-ACK codebook.

It should be understood that, the magnitude of the number illustrated in FIG. 4 does not indicate an execution order. For example, 420 may be executed before 440, that is, the target data may be detected after the DCI is detected. Alternatively, 420 and 440 may also be executed simultaneously. For example, the terminal device may start to detect the target data when detecting the DCI, and the detection of the target data does not have to wait for completion of DCI detection.

The network device may directly indicate the feedback parameter to the terminal device explicitly via the DCI. For example, the DCI carries the feedback parameter. By adding a new information field or multiplexing existing information fields in the DCI, any number of HARQ-ACK codebooks can be supported, which is not limited to the configuration of other information.

More preferably, the network device may indicate the feedback parameter to the terminal device implicitly via the DCI, for example, indicate the feedback parameter to the terminal device implicitly through related information of the DCI. The related information of the DCI includes at least one of: a format of the DCI, a control resource set (CORESET) where the DCI is located, and a search space where the DCI is located. The following specific description takes the CORESET as an example, and other indication methods (through the format of the DCI or the search space where the DCI is located, or any combination of the format of the DCI, the CORESET where the DCI is located, and the search space where the DCI is located) are similar, which will not be repeated herein.

For indicating the feedback parameter through the format of the DCI, different DCI formats may be used for different services, which has high flexibility. By indicating the feedback parameter through the CORESET or the search space where the DCI is located, HARQ-ACK codebook information can be obtained in advance before DCI decoding, and the terminal device can determine the type of the HARQ-ACK codebook early and process it in advance, thereby reducing the processing time.

In implementations of the present disclosure, the feedback parameter may include the feedback mode of the HARQ-ACK codebook or the feedback resource of the HARQ-ACK codebook, or include both the feedback mode and the feedback resource, which will be described in detail below.

Situation 1

The feedback parameter includes the feedback mode of the HARQ-ACK codebook.

Optionally, the method further includes the following. The network device determines the CORESET where the DCI is located according to the feedback parameter of the HARQ-ACK codebook.

For example, the network device determines that the CORESET where the DCI is located is a first CORESET if the feedback mode of the HARQ-ACK codebook is a first feedback mode, and/or the network device determines that the CORESET where the DCI is located is a second CORESET if the feedback mode of the HARQ-ACK codebook is a second feedback mode.

Correspondingly, in 450, the terminal device determines that the feedback mode of the HARQ-ACK codebook is the first feedback mode if the CORESET where the DCI is located is the first CORESET, and/or the terminal device determines that the feedback mode of the HARQ-ACK codebook is the second feedback mode if the CORESET where the DCI is located is the second CORESET.

Optionally, in 470, the network device may receive the HARQ-ACK codebook transmitted by the terminal device according to the semi-static feedback mode, and the HARQ-ACK codebook includes HARQ-ACK information of DL data scheduled by the DCI in the first CORESET, and/or the network device may receive the HARQ-ACK codebook transmitted by the terminal device according to the dynamic feedback mode, and the HARQ-ACK codebook includes HARQ-ACK information of DL data scheduled by the DCI in the second CORESET.

That is, for different feedback modes of the HARQ-ACK codebook selected by the network device for the terminal device, the network device uses different CORESETs to transmit the DCI. If the feedback mode of the HARQ-ACK codebook is the first feedback mode, for example, the semi-static feedback mode, the network device may transmit the DCI at the first CORESET. After receiving the DCI for scheduling the target data, the terminal device may find that the CORESET where the DCI is located is the first CORESET, and then transmit the HARQ-ACK codebook to the network device in the first feedback mode. If the feedback mode of the HARQ-ACK codebook is the second feedback mode, for example, the dynamic feedback mode, the network device may transmit the DCI at the second CORESET. After receiving the DCI for scheduling the target data, the terminal device may find that the CORESET where the DCI is located is the second CORESET, and then transmit the HARQ-ACK codebook to the network device in the second feedback mode.

For example, the network device may transmit first configuration information to the terminal device, where the first configuration information indicates a correspondence between the related information of the DCI and the feedback mode of the HARQ-ACK codebook. The terminal device may receive the first configuration information transmitted by the network device and obtain the correspondence from the first configuration information.

Of course, the correspondence may also be agreed upon in an agreement, and the terminal device may obtain the correspondence prestored in the terminal device.

The first configuration information may be a high-layer signaling. For example, the related information is the CORESET where the DCI is located, a correspondence between the CORESET and the feedback mode of the HARQ-ACK codebook may be as illustrated in Table 1.

TABLE 1

| CORESET | feedback mode |
|---|---|
| first CORESET | first feedback mode |
| second CORESET | second feedback mode |

Optionally, the method further includes the following. Before determining the DCI according to the feedback mode of the HARQ-ACK codebook, the network device determines the feedback mode of the HARQ-ACK codebook according to a data amount of DL data.

For example, the network device determines that the feedback mode of the HARQ-ACK codebook is the semi-static feedback mode, if a data amount of DL data corresponding to the HARQ-ACK codebook is greater than or equal to a preset threshold, and/or the network device determines that the feedback mode of the HARQ-ACK codebook is the dynamic feedback mode, if the data amount of the DL data corresponding to the HARQ-ACK codebook is less than or equal to the preset threshold.

In other words, the network device determines that the CORESET where the DCI is located is the first CORESET if the amount of the DL data is greater than or equal to the preset threshold, and/or the network device determines that the CORESET where the DCI is located is the second CORESET if the amount of the DL data is less than or equal to the preset threshold.

Figure 5:
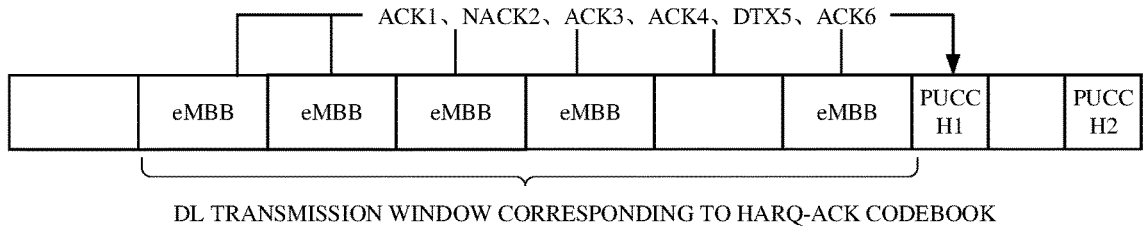
FIGS. 5 and 6 are schematic diagrams of HARQ-ACK codebook transmission under different traffic volumes according to implementations of the present disclosure.
Figure 6:
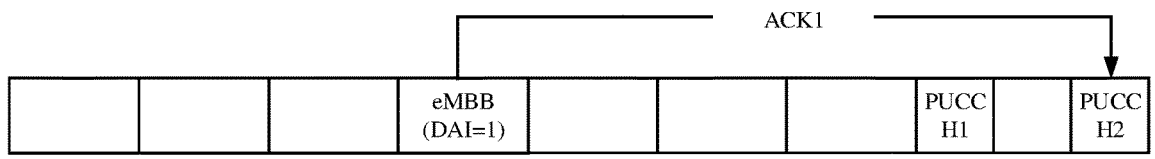

For example, as illustrated in FIGS. 5 and 6, FIG. 5 is a schematic diagram of HARQ-ACK codebook transmission in a semi-static feedback mode, and FIG. 6 is a schematic diagram of HARQ-ACK codebook transmission in a dynamic feedback mode. As illustrated in FIG. 5, a data amount of DL data corresponding to the HARQ-ACK codebook is large. A DL transmission window corresponding to the HARQ-ACK codebook includes six DL transmission resources, and there is DL data on the first transmission resource, the second transmission resource, the third transmission resource, the fourth transmission resource, and the sixth transmission resource among the six DL transmission resources. The HARQ-ACK information of the DL data on the five transmission resources is ACK 1, NACK 2, ACK 3, ACK 4, and ACK 6 in sequence. There is no DL data on the fifth transmission resource in the transmission window, which is denoted as DTX 5. The terminal device may transmit the HARQ-ACK codebook on PUCCH 1, and the HARQ-ACK codebook includes six indicator fields indicating the HARQ-ACK information of the DL data on the six transmission resources in sequence. Assuming that 1 represents ACK and 0 represents NACK, then the HARQ-ACK codebook may be 1011x1, where "x" represents a placeholder, which indicates that there is no DL data on the fifth transmission resource and thus there is no HARQ-ACK information feedback.

As illustrated in FIG. 6, a data amount of DL data corresponding to the HARQ-ACK codebook is small, and there is DL data only on the third transmission resource in a DL transmission window corresponding to the HARQ-ACK codebook and no DL data on other transmission resources. In this case, if the semi-static feedback mode is adopted, a 6-bit HARQ-ACK codebook may still be fed back, thereby increasing unnecessary bit overhead. Therefore, as illustrated in FIG. 6, in this case, the terminal device may transmit a 1-bit HARQ-ACK codebook to the network device in the dynamic feedback mode, thereby reducing the bit overhead.

It can be seen from FIGS. 5 and 6 that, the network device may select the feedback mode for the terminal device to transmit the HARQ-ACK codebook, based on the data amount of the DL data for which the HARQ-ACK information needs to be fed back. If the data amount is large, the DCI is transmitted on the first CORESET, so that the terminal device may know to transmit the HARQ-ACK codebook in the semi-static feedback mode according to the CORESET where the DCI is located. If the data amount is small, the DCI is transmitted on the second CORESET, so that the terminal device may know to transmit the HARQ-ACK codebook in the dynamic feedback mode according to the CORESET where the DCI is located.

Situation 2

The feedback parameter includes the feedback resource of the HARQ-ACK codebook.

Optionally, the method further includes the following. The network device determines an uplink (UL) control channel for the terminal device to transmit the HARQ-ACK codebook, according to a traffic type of the target data. The network device transmits second configuration information to the terminal device. The second configuration information indicates the UL control channel for transmitting the HARQ-ACK codebook and is carried in a last DCI among DCIs with same related information as the DCI.

Optionally, in situation 2, CORESETs where DCIs for scheduling DL data of different traffic types are located are different. For example, for a DCI used for scheduling URLLC type DL data, a CORESET where the DCI is located may be a first CORESET, and for a DCI used for scheduling eMBB type DL data, a CORESET where the DCI is located may be a second CORESET. For another example, for a DCI used for scheduling eMBB type DL data, a CORESET where the DCI is located may be the first CORESET, and for a DCI used for scheduling URLLC type DL data, a CORESET where the DCI is located may be the second CORESET.

Therefore, correspondingly, in 450, the terminal device may determine an UL control channel for transmitting the HARQ-ACK codebook according to the second configuration information carried in the last DCI among the DCIs with the same related information as the DCI. In 460, the terminal device may transmit the HARQ-ACK codebook to the network device on the UL control channel.

Optionally, in 470, the network device may receive the HARQ-ACK codebook transmitted by the terminal device on the UL control channel. HARQ-ACK codebooks received by the network device on different UL control channels includes HARQ-ACK information of DL data scheduled by DCIs with different related information. For example, the network device receives, on a first UL control channel, HARQ-ACK information of DL data scheduled by a DCI in the first CORESET, and receives, on a second UL control channel, HARQ-ACK information of DL data scheduled by a DCI in the second CORESET.

It should be understood that, among multiple DCIs with same related information, an UL control channel carried in the last DCI is used to transmit the HARQ-ACK codebook. That is, the UL control channel on which the terminal device transmits the HARQ-ACK codebook is not necessarily based on the UL control channel carried in the DCI for scheduling the target data, but based on the DL control channel carried in the last DCI among the DCIs with the same related information. If the DCI for scheduling the target data is the last DCI among the DCIs with the same related information, the UL control channel indicated by the DCI for scheduling the target data is used to transmit the HARQ-ACK codebook.

Figure 7:
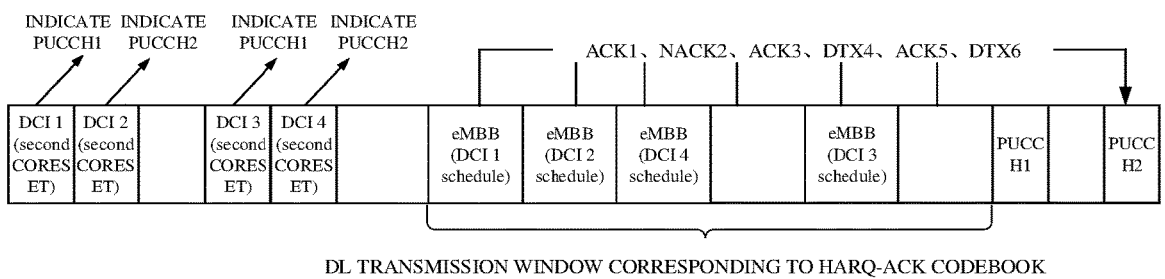
FIG. 7 is a schematic diagram of a physical uplink control channel (PUCCH) for HARQ-ACK codebook transmission according to implementations of the present disclosure.

For example, as illustrated in FIG. 7, taking the static feedback mode as an example, a CORESET where a DCI for scheduling eMBB type data is located is a second CORESET. A PUCCH indicated in DCI 1 and DCI 3 is PUCCH 1, and a PUCCH indicated in DCI 2 and DCI 4 is PUCCH 2. Since DCI 4 is the last DCI transmitted, and the PUCCH indicated in DCI 4 is PUCCH 2, HARQ-ACK information of four pieces of eMBB type DL data may be fed back on PUCCH 2. As illustrated in FIG. 7, a HARQ-ACK codebook transmitted on PUCCH 2 is 101x1x, where "x" is a placeholder, which indicates that there is no DL data on the fourth and sixth transmission resources and thus there is no HARQ-ACK information.

DL data of different traffic types has different delay and reliability requirements. Therefore, in implementations, UL control channels used to transmit these DL data may also be different. These different traffic types may include eMBB, URLLC, mMTC, etc., for example.

For example, the network device may determine that the UL control channel for transmitting the HARQ-ACK codebook is a first UL control channel, if the traffic type of the target data is URLLC, and/or the network device may determine that the UL control channel for transmitting the HARQ-ACK codebook is the second UL control channel, if the traffic type of the target data is eMBB.

Optionally, the first UL control channel precedes the second UL control channel in time domain, and/or a coding rate of the first UL control channel is lower than a coding rate of the second UL control channel.

Figure 8:
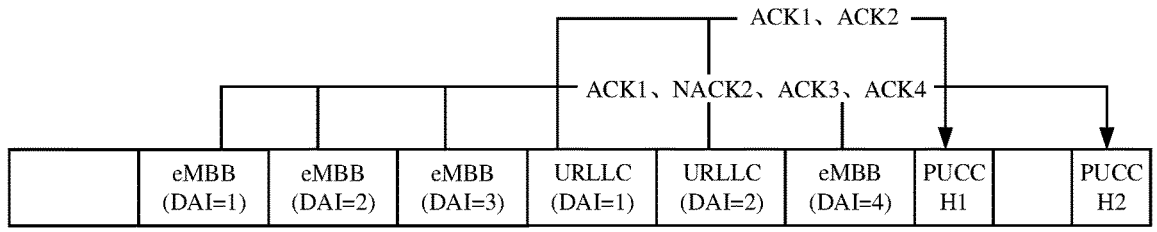
FIG. 8 is a schematic diagram of HARQ-ACK codebook transmission of data of different traffic types according to implementations of the present disclosure.

For example, as illustrated in FIG. 8, taking the dynamic feedback mode as an example, eMBB type data has a low latency requirement, and a HARQ-ACK codebook of this type of data may be transmitted on the later PUCCH 2, while URLLC type data has a high latency requirement, and a HARQ-ACK codebook of this type of data may be transmitted on the earlier PUCCH 1. In addition, URLLC type data requires high reliability. When a HARQ-ACK codebook of URLLC type data is transmitted on PUCCH 1, the code rate needs to be set low. When a HARQ-ACK codebook of eMBB type data is transmitted on PUCCH 2, the code rate may be set high. Optionally, a CORESET where a DCI for scheduling URLLC type DL data is located is a first CORESET, and a CORESET where a DCI for scheduling eMBB type DL data is located is a second CORESET.

As illustrated in FIG. 8, assuming that the HARQ-ACK information of four pieces of eMBB type DL data is ACK 1, NACK 2, ACK 3, and ACK 4 respectively, and the HARQ-ACK information of two pieces of URLLC type data is ACK1 and ACK2 respectively, then the HARQ-ACK codebook transmitted on PUCCH 2 may be 1011, and the HARQ-ACK codebook transmitted on PUCCH 1 may be 11.

HARQ-ACK information of data of different traffic types may be fed back separately. Therefore, when the HARQ-ACK information of data of different types is fed back, feedback requirements of different DL data may be met without resource waste.

In both situations, optionally, HARQ-ACK information of DL data scheduled by DCIs with different related information is in different HARQ-ACK codebooks. In other words, the HARQ-ACK information of the DL data scheduled by the DCIs with different related information is fed back on different UL control channels.

For example, for situation 2, HARQ-ACK information of URLLC type DL data scheduled by a DCI on the first CORESET is transmitted on PUCCH 1 through a HARQ-ACK codebook, and HARQ-ACK information of eMBB type DL data scheduled by a DCI on the second CORESET is transmitted on PUCCH 2 through a HARQ-ACK codebook.

It should be understood that, in implementations of the present disclosure, situation 1 and situation 2 may be implemented separately or simultaneously. For example, the network device may determine which CORESET to transmit the DCI for scheduling the target data, according to the feedback mode of the HARQ-ACK codebook corresponding to the target data and the traffic type of the target data.

For example, the feedback mode includes a semi-static feedback mode or a dynamic feedback mode, and the traffic type includes eMBB and URLLC. The network device may comprehensively consider the feedback mode of the HARQ-ACK codebook and the traffic type of the target data, for example, consider the feedback mode first and then the traffic type, or consider the traffic type first and then the feedback mode, and refer to a correspondence between the feedback mode, the traffic type, and the CORESET illustrated in any of Tables 2 to 6, to select an appropriate CORESET from the first CORESET and the second CORESET to transmit the DCI for scheduling the target data.

TABLE 2

| CORESET | feedback mode | traffic type |
| --- | --- | --- |
| first CORESET | semi-static feedback mode | eMBB |
| second CORESET | dynamic feedback mode | URLLC |

TABLE 3

| CORESET | feedback mode | traffic type |
| --- | --- | --- |
| first CORESET | semi-static feedback mode | URLLC |
| second CORESET | dynamic feedback mode | eMBB |

TABLE 4

| CORESET | feedback mode | traffic type |
| --- | --- | --- |
| first CORESET | semi-static feedback mode | eMBB<br>URLLC |
| second CORESET | dynamic feedback mode | eMBB<br>URLLC |

TABLE 5

| CORESET | traffic type | feedback mode |
| --- | --- | --- |
| first CORESET | eMBB | semi-static feedback mode<br>dynamic feedback mode |
| second CORESET | URLLC | semi-static feedback mode<br>dynamic feedback mode |

Of course, more preferably, if the network device needs to achieve both situation 1 and situation 2, then four CORESETs may also be configured, for example, reference may be made to a correspondence between the feedback mode, the traffic type, and the CORESET illustrated in Table 6. According to methods described in situation 1 and situation 2, the network device may comprehensively consider the feedback mode of the HARQ-ACK codebook and the traffic type of the target data, to select an appropriate CORESET from the first CORESET, the second CORESET, the third CORESET, and the fourth CORESET to transmit the DCI for scheduling the target data.

TABLE 6

| CORESET | feedback mode | traffic type |
| --- | --- | --- |
| first CORESET | semi-static feedback mode | URLLC |
| second CORESET | dynamic feedback mode | eMBB |
| third CORESET | semi-static feedback mode | eMBB |
| fourth CORESET | dynamic feedback mode | URLLC |

On the basis of all implementations above, the feedback parameter further includes a multiplexing window length of the HARQ-ACK codebook. The multiplexing window length of the HARQ-ACK codebook may be configured by a parameter SubslotLength-ForPUCCH.

The network device may transmit third configuration information to the terminal device, where the third configuration information indicates a correspondence between related information of the DCI and the multiplexing window length of the HARQ-ACK codebook. The terminal device receives the third configuration information transmitted by the network device and obtain the correspondence from the third configuration information. Of course, the correspondence may also be agreed upon in an agreement, and the terminal device may obtain the correspondence prestored in the terminal device.

Optionally, in some implementations, the multiplexing window length of the HARQ-ACK codebook and the feedback mode of the HARQ-ACK codebook are in a constraint relationship.

As an example, the constraint relationship includes: the feedback mode of the HARQ-ACK codebook is the dynamic feedback mode, if the multiplexing window length of the HARQ-ACK codebook is less than a time slot length.

Generally, the size of a semi-static HARQ-ACK codebook is determined semi-statically, for example, based on potential non-repetitive DL transmission opportunities, which does not depend on an actual transmission situation. Therefore, information will be transmitted regardless of whether actual transmission occurs or not. In this case, there will be transmission of redundant information.

For a HARQ-ACK feedback codebook with a multiplexing window length less than one time slot, a feedback frequency is increased. Taking a multiplexing window length of two symbols as an example, the HARQ-ACK feedback frequency may reach seven feedbacks per time slot. For a HARQ-ACK feedback with a multiplexing window of one time slot, the feedback frequency may only reach one feedback per time slot.

If the multiplexing window length is less than one time slot, adopting the semi-static feedback mode may result in frequent transmission of redundant information, thereby occupying a system resource and inefficiently consuming energy of the terminal device. Therefore, for a HARQ-ACK feedback with a multiplexing window length less than one time slot, a semi-static HARQ-ACK codebook should be avoided, that is, only a dynamic HARQ-ACK codebook, that is, the dynamic feedback mode, should be supported, thereby improving system resource utilization and reducing the energy consumption of the terminal device.

It should be understood that, a HARQ-ACK feedback with a multiplexing window length less than one time slot is mainly used for URLLC traffics, and a semi-static feedback may affect reliability or transmission efficiency of URLLC traffics due to redundant bits. Therefore, the semi-static feedback is also not the best for URLLC traffics. Therefore, when the multiplexing window length is less than one time slot, the dynamic feedback mode is adopted, thereby increasing the utilization rate of system resources and reducing the energy consumption of the terminal device without significant system loss and substantial flexibility reduction.

In some implementations, the length of the multiplexing window of the HARQ-ACK codebook is one of the following lengths: one time slot, half time slot, seven symbols, and two symbols.

It should be noted that, implementations and/or technical features therein described in the present disclosure may be combined with each other arbitrarily without conflict, and a technical solution obtained through the combination should also fall within the protection scope of the present disclosure.

It should be understood that, in implementations of the present disclosure, the magnitude of the number of the above process does not indicate an execution order, and the execution order of the process should be determined by the function and the internal logic thereof, which should not constitute any limitation to the implementation process of implementations of the present disclosure.

The communication method according to implementations of the present disclosure is described in detail above. An apparatus according to implementations of the present disclosure will be described below with reference to FIGS. 9 to 12. Technical features described in method implementations are applicable to the following apparatus implementations.

Figure 9:
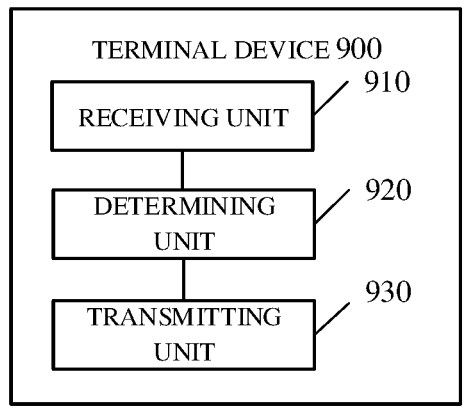
FIG. 9 is a schematic block diagram of a terminal device according to implementations of the present disclosure.

FIG. 9 is a schematic block diagram of a terminal device 900 according to implementations of the present disclosure.

As illustrated in FIG. 9, the terminal device 900 includes a receiving unit 910, a determining unit 920, and a transmitting unit 930.

The receiving unit 910 is configured to receive a DCI transmitted by a network device for scheduling target data.

The receiving unit 910 is further configured to receive the target data transmitted by the network device.

The determining unit 920 is configured to: determine a feedback parameter of a HARQ-ACK codebook according to the DCI received by the receiving unit 910, where the HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode.

The transmitting unit 930 is configured to transmit the HARQ-ACK codebook to the network device according to the feedback parameter determined by the determining unit 920.

Therefore, the network device may flexibly indicate to the terminal device via the DCI the feedback parameter to be used to feed back the HARQ-ACK codebook. After receiving the DCI, the terminal device may obtain the feedback parameter used to transmit the HARQ-ACK codebook according to the DCI, thereby meeting the feedback requirements of different DL data without resource waste.

Optionally, the feedback parameter includes the feedback mode of the HARQ-ACK codebook, and the determining unit 920 is specifically configured to: determine that the feedback mode of the HARQ-ACK codebook is a first feedback mode, if related information of the DCI is first related information, and/or determine that the feedback mode of the HARQ-ACK codebook is a second feedback mode, if the related information of the DCI is second related information.

Optionally, the receiving unit 910 is further configured to: receive first configuration information transmitted by the network device, where the first configuration information indicates a correspondence between the related information of the DCI and the feedback mode of the HARQ-ACK codebook, or the terminal device further includes an obtaining unit configured to obtain the correspondence prestored in the terminal device.

Optionally, the determining unit 920 is further configured to: determine a position of the HARQ-ACK information of the target data in the HARQ-ACK codebook according to a position of the target data in a DL transmission window corresponding to the HARQ-ACK codebook, if the terminal device determines that the feedback mode of the HARQ-ACK codebook is the semi-static feedback mode.

Optionally, the determining unit 920 is further configured to: determine a position of the HARQ-ACK information of the target data in the HARQ-ACK codebook according to a DAI of the target data carried in the DCI, if the terminal device determines that the feedback mode of the HARQ-ACK codebook is the dynamic feedback mode.

Optionally, the feedback parameter includes the feedback resource of the HARQ-ACK codebook, and the determining unit 920 is specifically configured to: determine an UL control channel for transmitting the HARQ-ACK codebook, according to second configuration information carried in a last DCI among DCIs with same related information as the DCI, where the second configuration information indicates the UL control channel. The transmitting unit 930 is specifically configured to: transmit the HARQ-ACK codebook to the network device on the UL control channel.

Optionally, HARQ-ACK information of DL data scheduled by DCIs with different related information is in different HARQ-ACK codebooks.

Optionally, the related information of the DCI includes at least one of: a format of the DCI, a CORESET where the DCI is located, and indication information of a search space where the DCI is located.

Optionally, the DCI indicates the feedback parameter.

Optionally, the feedback parameter further includes a multiplexing window length of the HARQ-ACK codebook.

Optionally, the receiving unit 910 is further configured to: receive third configuration information transmitted by the network device, where the third configuration information indicates a correspondence between related information of the DCI and the multiplexing window length of the HARQ-ACK codebook, or obtain the correspondence prestored in the terminal device.

Optionally, the multiplexing window length of the HARQ-ACK codebook and the feedback mode of the HARQ-ACK codebook are in a constraint relationship.

Optionally, the constraint relationship includes: the feedback mode of the HARQ-ACK codebook is the dynamic feedback mode, if the multiplexing window length of the HARQ-ACK codebook is less than a time slot length.

Optionally, the multiplexing window length of the HARQ-ACK codebook is one of: one time slot, half time slot, seven symbols, and two symbols.

It should be understood that, the terminal device 900 may perform the corresponding operations performed by the terminal device in the method 400, which will not be repeated herein for the sake of simplicity.

Figure 10:
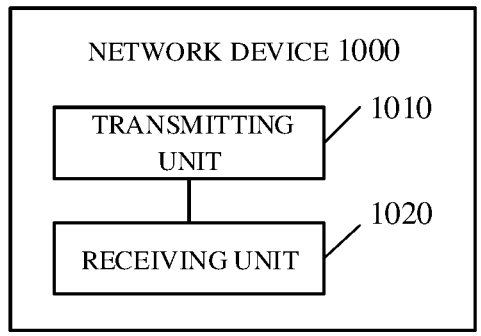
FIG. 10 is a schematic block diagram of a network device according to implementations of the present disclosure.

FIG. 10 is a schematic block diagram of a network device 1000 according to implementations of the present disclosure. As illustrated in FIG. 10, the network device 1000 includes a transmitting unit 1010 and a receiving unit 1020.

The transmitting unit 1010 is configured to: transmit a DCI to a terminal device for scheduling target data, where the DCI is used for the terminal device to determine a feedback parameter of a HARQ-ACK codebook, the HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode.

The transmitting unit 1010 is further configured to transmit the target data to the terminal device.

The receiving unit 1020 is configured to receive the HARQ-ACK codebook transmitted by the terminal device according to the feedback parameter.

Therefore, the network device may flexibly indicate to the terminal device via the DCI the feedback parameter to be used to feed back the HARQ-ACK codebook. After receiving the DCI, the terminal device may obtain the feedback parameter used to transmit the HARQ-ACK codebook according to the DCI, thereby meeting the feedback requirements of different DL data without resource waste.

Optionally, the feedback parameter includes the feedback mode of the HARQ-ACK codebook, and the network device further includes a determining unit configured to: determine that related information of the DCI is first related information, if the feedback mode of the HARQ-ACK codebook is a first feedback mode, and/or determine that the related information of the DCI is second related information, if the feedback mode of the HARQ-ACK codebook is a second feedback mode.

Optionally, the transmitting unit 1010 is further configured to: transmit first configuration information to the terminal device, where the first configuration information indicates a correspondence between the related information of the DCI and the feedback mode of the HARQ-ACK codebook.

Optionally, the determining unit is further configured to: determine that the feedback mode of the HARQ-ACK codebook is the semi-static feedback mode, if a data amount of DL data corresponding to the HARQ-ACK codebook is greater than or equal to a preset threshold, and/or determine that the feedback mode of the HARQ-ACK codebook is the dynamic feedback mode, if the data amount of the DL data corresponding to the HARQ-ACK codebook is less than or equal to the preset threshold.

Optionally, the receiving unit 1020 is specifically configured to: receive the HARQ-ACK codebook transmitted by the terminal device according to the first feedback mode, where the HARQ-ACK codebook includes HARQ-ACK information of DL data scheduled by a DCI, and the related information of the DCI is the first related information, and/or receive the HARQ-ACK codebook transmitted by the terminal device according to the second feedback mode, where the HARQ-ACK codebook includes HARQ-ACK information of DL data scheduled by a DCI, and the related information of the DCI is the second related information.

Optionally, the feedback parameter includes the feedback resource of the HARQ-ACK codebook, the determining unit is specifically configured to: determine an UL control channel for the terminal device to transmit the HARQ-ACK codebook, according to a traffic type of the target data, and the transmitting unit is configured to: transmit second configuration information to the terminal device, where the second configuration information indicates the UL control channel and is carried in a last DCI among DCIs with same related information as the DCI, and related information of DCIs for scheduling DL data of different traffic types is different.

Optionally, the determining unit is specifically configured to: determine that the UL control channel is a first UL control channel, if the traffic type of the target data is URLLC, and/or determine that the UL control channel is a second UL control channel, if the traffic type of the target data is eMBB.

Optionally, the first UL control channel precedes the second UL control channel in time domain, and/or a coding rate of the first UL control channel is lower than a coding rate of the second UL control channel.

Optionally, the receiving unit 1020 is specifically configured to: receive the HARQ-ACK codebook transmitted by the terminal device on the UL control channel, where HARQ-ACK codebooks received by the network device on different UL control channels include HARQ-ACK information of DL data scheduled by DCIs with different related information.

Optionally, HARQ-ACK information of DL data scheduled by DCIs with different related information is in different HARQ-ACK codebooks.

Optionally, the related information of the DCI includes at least one of: a format of the DCI, a CORESET where the DCI is located, and indication information of a search space where the DCI is located.

Optionally, the DCI indicates the feedback parameter.

Optionally, the feedback parameter further includes a multiplexing window length of the HARQ-ACK codebook.

Optionally, the transmitting unit 1010 is further configured to: transmit third configuration information to the terminal device, where the third configuration information indicates a correspondence between related information of the DCI and the multiplexing window length of the HARQ-ACK codebook.

Optionally, the multiplexing window length of the HARQ-ACK codebook and the feedback mode of the HARQ-ACK codebook are in a constraint relationship.

Optionally, the constraint relationship includes: the feedback mode of the HARQ-ACK codebook is the dynamic feedback mode, if the multiplexing window length of the HARQ-ACK codebook is less than a time slot length.

Optionally, the multiplexing window length of the HARQ-ACK codebook is one of: one time slot, half time slot, seven symbols, and two symbols.

It should be understood that, the communication device 1100 may perform the corresponding operations performed by the network device in the method 400, which will not be repeated herein for the sake of simplicity.

Figure 11:
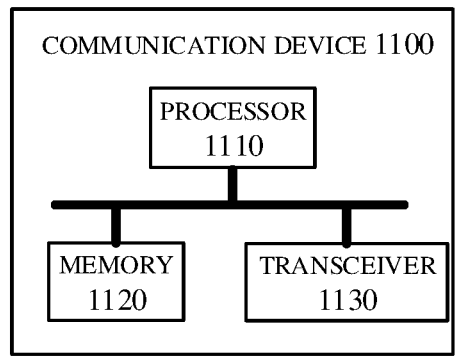
FIG. 11 is a schematic structural diagram of a communication device according to implementations of the present disclosure.

FIG. 11 is a schematic structural diagram of a communication device 1100 provided in implementations of the present disclosure. As illustrated in FIG. 11, the communication device 1100 includes a processor 1110. The processor 1110 can invoke and execute computer programs stored in a memory to perform the method provided in implementations of the present disclosure.

Optionally, as illustrated in FIG. 11, the communication device 1100 can further include the memory 1120. Specifically, the processor 1110 can invoke and execute the computer programs stored in the memory 1120 to perform the method provided in implementations of the present disclosure.

The memory 1120 may be a separate device independent of the processor 1110, or may be integrated into the processor 1110.

Optionally, as illustrated in FIG. 11, the communication device 1100 can further include a transceiver 1130. The processor 1110 can control the transceiver 1130 to communicate with other devices, for example, to transmit information or data to other devices, or to receive information or data from other devices.

The transceiver 1130 may include a transmitter and a receiver. The transceiver 1130 may further include an antenna, where one or more antennas can be provided.

Optionally, the communication device 1100 may be the terminal device of implementations of the present disclosure, and the communication device 1100 can implement the operations performed by the terminal device described in the foregoing method implementations of the present disclosure, which will not be repeated herein for the sake of simplicity.

Optionally, the communication device 1100 may be the network device of implementations of the present disclosure, and the communication device 1100 can implement the operations performed by the network device described in the foregoing method implementations of the present disclosure, which will not be repeated herein for the sake of simplicity.

Figure 12:
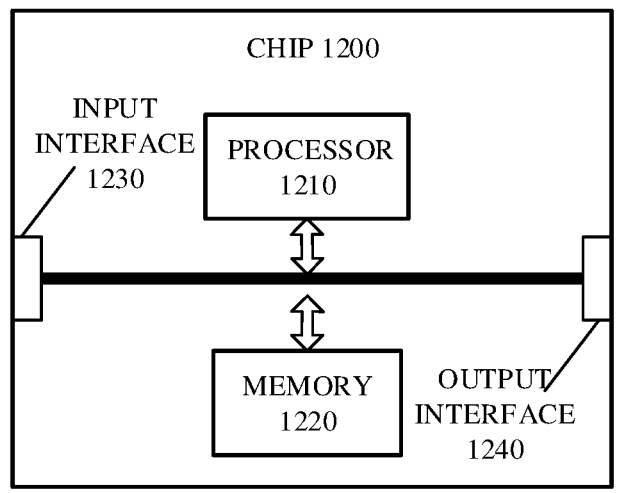
FIG. 12 is a schematic structural diagram of a chip according to implementations of the present disclosure.

FIG. 12 is a schematic structural diagram of a chip according to implementations of the present disclosure. As illustrated in FIG. 12, the chip 1200 includes a processor 1210. The processor 1210 is configured to invoke and execute computer programs stored in a memory to perform the method provided in implementations of the present disclosure.

Optionally, as illustrated in FIG. 12, the chip 1200 further includes a memory 1220. The processor 1210 can invoke and execute the computer programs stored in the memory 1220 to perform the method provided in implementations of the present disclosure.

The memory 1220 may be a separate device independent of the processor 1210, or may be integrated into the processor 1210.

Optionally, the chip 1200 may further include an input interface 1230. The processor 1210 can control the input interface 1230 to communicate with other devices or chips, for example, specifically, to acquire information or data transmitted by other devices or chips.

Optionally, the chip 1200 may further include an output interface 1240. The processor 1210 can control the output interface 1240 to communicate with other devices or chips, for example, specifically, to output information or data to other devices or chips.

Optionally, the chip is applicable to the terminal device of implementations of the present disclosure. The chip can implement the operations performed by the terminal device described in the foregoing method implementations, which will not be repeated herein for the sake of simplicity.

Optionally, the chip is applicable to the mobile terminal/terminal device of implementations of the present disclosure. The chip can implement the operations performed by the network device described in the foregoing method implementations, which will not be repeated herein for the sake of simplicity.

It should be understood that, the chip mentioned in implementations of the present disclosure may also be referred to as a system level chip, a system chip, a chip system, an on-chip system chip, etc.

It should be understood that, the processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or perform the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations of the present disclosure may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or a flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link dynamic random access memory (synch-link DRAM, SLDRAM), and a direct rambus RAM (DR RAM). It should be noted that, the memory of systems and methods described herein is intended to include, but is not limited to, these and any other suitable types of memories.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Figure 13:
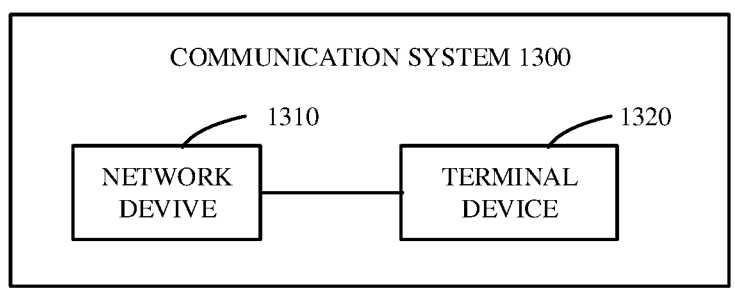
FIG. 13 is a schematic block diagram of a communication system according to implementations of the present disclosure.

FIG. 13 is a schematic block diagram of a communication system 1300 according to implementations of the present disclosure. As illustrated in FIG. 13, the communication system 1300 includes a network device 1310 and a terminal device 1320.

The network device 1310 is configured to: transmit a DCI to a terminal device for scheduling target data, where the DCI is used for the terminal device to determine a feedback parameter of a HARQ-ACK codebook, the HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode, transmit the target data to the terminal device, and receive the HARQ-ACK codebook transmitted by the terminal device according to the feedback parameter.

The terminal device 1320 is configured to: receive a DCI transmitted by a network device for scheduling target data, receive the target data transmitted by the network device, and determine a feedback parameter of a HARQ-ACK codebook according to the DCI, where the HARQ-ACK codebook includes HARQ-ACK information of the target data, the feedback parameter includes a feedback mode of the HARQ-ACK codebook and/or a feedback resource for transmitting the HARQ-ACK codebook, and the feedback mode of the HARQ-ACK codebook includes a semi-static feedback mode or a dynamic feedback mode, and transmit the HARQ-ACK codebook to the network device according to the feedback parameter.

The network device 1310 may be configured to implement the corresponding function implemented by the network device in the above method 400, and the composition of the network device 1310 may be as illustrated in the network device 1000 in FIG. 10.

The terminal device 1320 may be configured to implement the corresponding function implemented by the terminal device in the above method 400, and the composition of the terminal device 1320 may be as illustrated in the communication device 1100 in FIG. 11.

Implementations of the present disclosure further provide a computer-readable storage medium. The computer-readable storage medium is configured to store computer programs. Optionally, the computer-readable storage medium is applicable to the network device of implementations of the present disclosure. The computer programs are operable with a computer to implement the operations performed by the network device described in the foregoing method implementations, which will not be repeated herein for the sake of simplicity. Optionally, the computer-readable storage medium is applicable to the terminal device of implementations of the present disclosure. The computer programs are operable with a computer to implement the operations performed by the terminal device described in the foregoing method implementations, which will not be repeated herein for the sake of simplicity.

Implementations of the present disclosure further provide a computer program product. The computer program product includes computer program instructions. Optionally, the computer program product is applicable to the network device of implementations of the present disclosure. The computer program instructions are operable with a computer to implement the operations performed by the network device described in the foregoing method implementations, which will not be repeated herein for the sake of simplicity. Optionally, the computer program product is applicable to the terminal device of implementations of the present disclosure. The computer program instructions are operable with a computer to implement the operations performed by the terminal device described in the foregoing method implementations, which will not be repeated herein for the sake of simplicity.

Implementations of the present disclosure further provide a computer program. Optionally, the computer program is applicable to the network device of implementations of the present disclosure. The computer program, when executed by a computer, is operable with the computer to implement the operations performed by the network device described in the foregoing method implementations, which will not be repeated herein for the sake of simplicity. Optionally, the computer program is applicable to the terminal device of implementations of the present disclosure. The computer program, when executed by a computer, is operable with the computer to implement the operations performed by the terminal device described in the foregoing method implementations, which will not be repeated herein for the sake of simplicity.

It should be understood that, the terms "system" and "network" herein are usually interchangeable. The term "and/or" herein describes only an association relationship for describing associated objects and represents that three relationships may exist. For example, A and/or B may represent the following three cases: only A exists, both A and B exist, and only B exists. In addition, the character "/" herein generally indicates an "or" relationship between the associated objects.

It should also be understood that, in implementations of the present disclosure, "B corresponding to (which corresponds to) A" means that B is associated with A, and B can be determined according to A. However, "B can be determined according to A" does not mean that B can be determined only according to A, and instead, B can also be determined according to A and/or other information.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in implementations herein may be integrated into one processing unit or may be present as a number of physically separated units, and two or more units may be integrated into one.

If the integrated units are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for feedback information transmission, comprising:
receiving, by a terminal device, downlink control information (DCI) transmitted by a network device for scheduling target data;
receiving, by the terminal device, the target data transmitted by the network device;
determining, by the terminal device, a feedback parameter of a hybrid automatic repeat request-acknowledgement (HARQ-ACK) codebook according to the DCI, wherein the HARQ-ACK codebook comprises HARQ-ACK information of the target data, the feedback parameter comprises a feedback mode of the HARQ-ACK codebook, and the feedback mode of the HARQ- ACK codebook comprises a semi-static feedback mode or a dynamic feedback mode; and transmitting, by the terminal device, the HARQ-ACK codebook to the network device according to the feedback parameter, wherein determining, by the terminal device, the feedback parameter of the HARQ-ACK codebook according to the DCI comprises:

determining, by the terminal device, that the feedback mode of the HARQ-ACK codebook is the semi-static feedback mode, when a control resource set (CORESET) where the DCI is located is a first CORESET, wherein the CORESET where the DCI is located is the first CORESET when a data amount of downlink (DL) data corresponding to the HARQ-ACK codebook is greater than or equal to a preset threshold; and determining, by the terminal device, that the feedback mode of the HARQ-ACK codebook is the dynamic feedback mode, when the CORESET where the DCI is located is a second CORESET, wherein the CORESET where the DCI is located is the second CORESET when the data amount of the DL data corresponding to the HARQ-ACK codebook is less than the preset threshold.

2. The method of claim 1, wherein the feedback parameter further comprises a feedback resource for transmitting the HARQ-ACK codebook.

3. The method of claim 1, further comprising:

receiving, by the terminal device, first configuration information transmitted by the network device, wherein the first configuration information indicates a correspondence between the CORESET where the DCI is located and the feedback mode of the HARQ-ACK codebook; or obtaining, by the terminal device, the correspondence prestored in the terminal device.

4. The method of claim 1, further comprising:

determining, by the terminal device, a position of the HARQ-ACK information of the target data in the HARQ-ACK codebook according to a position of the target data in a DL transmission window corresponding to the HARQ-ACK codebook, when the terminal device determines that the feedback mode of the HARQ-ACK codebook is the semi-static feedback mode.

5. The method of claim 1, further comprising:

determining, by the terminal device, a position of the HARQ-ACK information of the target data in the HARQ-ACK codebook according to a downlink assignment index (DAI) of the target data carried in the DCI, when the terminal device determines that the feedback mode of the HARQ-ACK codebook is the dynamic feedback mode.

6. The method of claim 1, wherein HARQ-ACK information of DL data scheduled by DCIs located in different CORESETs is in different HARQ-ACK codebooks.

7. The method of claim 1, wherein the feedback parameter further comprises a multiplexing window length of the HARQ-ACK codebook.

8. The method of claim 7, wherein the multiplexing window length of the HARQ-ACK codebook is one of: one time slot, half time slot, seven symbols, and two symbols.

9. A terminal device, comprising:

a memory configured to store computer programs; and a processor configured to invoke and execute the computer programs stored in the memory to cause the terminal device to:

receive downlink control information (DCI) transmitted by a network device for scheduling target data;

receive the target data transmitted by the network device;

determine a feedback parameter of a hybrid automatic repeat request-acknowledgement (HARQ-ACK) codebook according to the DCI, wherein the HARQ-ACK codebook comprises HARQ-ACK information of the target data, the feedback parameter comprises a feedback mode of the HARQ-ACK codebook, and the feedback mode of the HARQ-ACK codebook comprises a semi-static feedback mode or a dynamic feedback mode; and transmit the HARQ-ACK codebook to the network device according to the feedback parameter, wherein the terminal device is caused to:

determine that the feedback mode of the HARQ-ACK codebook is the semi-static feedback mode, when a control resource set (CORESET) where the DCI is located is a first CORESET, wherein the CORESET where the DCI is located is the first CORESET when a data amount of downlink (DL) data corresponding to the HARQ-ACK codebook is greater than or equal to a preset threshold; and determine that the feedback mode of the HARQ-ACK codebook is the dynamic feedback mode, when the CORESET where the DCI is located is a second CORESET, wherein the CORESET where the DCI is located is the second CORESET when the data amount of the DL data corresponding to the HARQ-ACK codebook is less than the preset threshold.

10. The terminal device of claim 9, wherein the feedback parameter further comprises a feedback resource for transmitting the HARQ-ACK codebook.

11. The terminal device of claim 9, wherein the terminal device is further caused to:

receive first configuration information transmitted by the network device, wherein the first configuration information indicates a correspondence between the CORESET where the DCI is located and the feedback mode of the HARQ-ACK codebook; or obtain the correspondence prestored in the terminal device.

12. The terminal device of claim 9, wherein the terminal device is further caused to:

determine a position of the HARQ-ACK information of the target data in the HARQ-ACK codebook according to a position of the target data in a DL transmission window corresponding to the HARQ-ACK codebook, when the terminal device determines that the feedback mode of the HARQ-ACK codebook is the semi-static feedback mode.

13. The terminal device of claim 9, wherein the terminal device is further caused to:

determine a position of the HARQ-ACK information of the target data in the HARQ-ACK codebook according to a downlink assignment index (DAI) of the target data carried in the DCI, when the terminal device determines that the feedback mode of the HARQ-ACK codebook is the dynamic feedback mode.

14. The terminal device of claim 9, wherein HARQ-ACK information of DL data scheduled by DCIs located in different CORESETs is in different HARQ-ACK codebooks.

15. A network device, comprising:

a memory configured to store computer programs; and a processor configured to invoke and execute the computer programs stored in the memory to cause the network device to:

transmit downlink control information (DCI) to a terminal device for scheduling target data, wherein the DCI is used for the terminal device to determine a feedback parameter of a hybrid automatic repeat request-acknowledgement (HARQ-ACK) codebook, the HARQ-ACK codebook comprises HARQ-ACK information of the target data, the feedback parameter comprises a feedback mode of the HARQ-ACK codebook, and the feedback mode of the HARQ-ACK codebook comprises a semi-static feedback mode or a dynamic feedback mode;

transmit the target data to the terminal device; and receive the HARQ-ACK codebook transmitted by the terminal device according to the feedback parameter, wherein the network device is further caused to:
   determine that the feedback mode of the HARQ-ACK codebook is the semi-static feedback mode, when a data amount of downlink (DL) data corresponding to the HARQ-ACK codebook is greater than or equal to a preset threshold, and, when the feedback mode of the HARQ-ACK codebook is the semi-static feedback mode, determine that a control resource set (CORESET) where the DCI is located is a first CORESET; and
   determine that the feedback mode of the HARQ-ACK codebook is the dynamic feedback mode, when the data amount of the DL data corresponding to the HARQ-ACK codebook is less than the preset threshold, and, when the feedback mode of the HARQ-ACK codebook is the dynamic feedback mode, determine that the CORESET where the DCI is located is a second CORESET.

16. The network device of claim 15, wherein the feedback parameter further comprises a feedback resource for transmitting the HARQ-ACK codebook.

17. The network device of claim 15, wherein the network device is further caused to:
transmit first configuration information to the terminal device, wherein the first configuration information indicates a correspondence between the CORESET where the DCI is located and the feedback mode of the HARQ-ACK codebook.

18. The network device of claim 15, wherein the network device is specifically caused to:
receive the HARQ-ACK codebook transmitted by the terminal device according to the semi-static feedback mode, wherein the HARQ-ACK codebook comprises HARQ-ACK information of DL data scheduled by a DCI, and the CORESET where the DCI is located is the first CORESET; and/or
receive the HARQ-ACK codebook transmitted by the terminal device according to the dynamic feedback mode, wherein the HARQ-ACK codebook comprises HARQ-ACK information of DL data scheduled by a DCI, and the CORESET where the DCI is located is the second CORESET.

19. The network device of claim 15, wherein HARQ-ACK information of DL data scheduled by DCIs located in different CORESETs is in different HARQ-ACK codebooks.

* * * * *